(12) United States Patent
Ertl et al.

(10) Patent No.: US 7,905,688 B2
(45) Date of Patent: Mar. 15, 2011

(54) MILLING TOOL

(75) Inventors: Christian Ertl, Ehenbichl (AT); Josef Prast, Pflach (AT)

(73) Assignee: Ceratizit Austria Gesellschaft mbH, Reutte (AT)

( * ) Notice: Subject to any disclaimer, the term of this patent is extended or adjusted under 35 U.S.C. 154(b) by 30 days.

(21) Appl. No.: 12/099,451

(22) Filed: Apr. 8, 2008

(65) Prior Publication Data

US 2008/0187403 A1 Aug. 7, 2008

Related U.S. Application Data

(63) Continuation of application No. PCT/AT2006/000426, filed on Oct. 18, 2006.

(30) Foreign Application Priority Data

Oct. 19, 2005 (AT) .............................. GM705/2005

(51) Int. Cl.
*B23C 5/20* (2006.01)
*B23C 5/10* (2006.01)

(52) U.S. Cl. ................ 407/42; 407/53; 407/61; 407/113

(58) Field of Classification Search .................... 407/34, 407/35, 113, 114, 115, 116, 62, 63, 40, 42, 407/54
See application file for complete search history.

(56) References Cited

U.S. PATENT DOCUMENTS

| 4,068,976 A | 1/1978 | Friedline |
| 5,078,550 A | 1/1992 | Satran et al. |
| 5,145,295 A | 9/1992 | Satran |

(Continued)

FOREIGN PATENT DOCUMENTS

DE 197 09 436 A1 9/1998

(Continued)

OTHER PUBLICATIONS

Austrian Patent Office Search Report, dated Jul. 6, 2006.

(Continued)

*Primary Examiner* — Boyer D Ashley
*Assistant Examiner* — Sara Addisu
(74) *Attorney, Agent, or Firm* — Laurence A. Greenberg; Werner H. Stemer; Ralph E. Locher (57) ABSTRACT

A milling tool with an axis of rotation D has a tool shank and a cutter region. The cutter region has a planar cutting edge running approximately perpendicularly to the axis of rotation D and merges peripherally into a main cutting edge and centrally into a secondary cutting edge. The secondary cutting edge is offset rearwardly from the planar cutting edge in the direction of the axis of rotation D. The transitional zone between the planar cutting edge and the secondary cutting edge has a notch produced as a cutting edge portion. The rearmost point of this notch, as seen in an end view in the direction of the axis of rotation D, lies behind the forwardmost point of the secondary cutting edge, the angle α between the planar cutting edge and the adjoining portion of the notch lying in the range of 90° to 175°, and the angle β between the planar cutting edge and that portion of the notch adjoining the secondary cutting edge lying in the range of 3° to 90°. The angle γ between that portion of the notch adjoining the secondary cutting edge and the secondary cutting edge lies in the range of 90° to 177°.

12 Claims, 5 Drawing Sheets

U.S. PATENT DOCUMENTS

| | | |
|---|---|---|
| 5,160,232 A | 11/1992 | Maier |
| 5,209,611 A | 5/1993 | Drescher |
| 6,053,672 A * | 4/2000 | Satran et al. ............... 407/40 |
| 6,142,716 A * | 11/2000 | Jordberg et al. ............ 407/114 |
| 6,193,446 B1 * | 2/2001 | Astrom et al. .............. 407/114 |
| 6,213,691 B1 | 4/2001 | Leeb |
| 6,293,737 B1 | 9/2001 | Satran et al. |
| 6,626,614 B2 * | 9/2003 | Nakamura ................... 408/59 |
| 6,935,814 B2 * | 8/2005 | Nagaya et al. .............. 407/100 |
| 7,040,844 B1 * | 5/2006 | Daiguji ........................ 407/113 |
| 7,261,497 B2 * | 8/2007 | Maeda ......................... 407/113 |
| 7,281,884 B2 * | 10/2007 | Maeda ......................... 407/113 |
| 7,402,005 B2 * | 7/2008 | Deitert ......................... 407/113 |
| 7,520,699 B2 * | 4/2009 | Ballas et al. ................. 407/113 |

FOREIGN PATENT DOCUMENTS

| | | |
|---|---|---|
| EP | 0 416 901 A2 | 3/1991 |
| EP | 0 457 488 A1 | 11/1991 |
| EP | 1 002 608 A2 | 5/2000 |

OTHER PUBLICATIONS

International Search Report, dated Feb. 22, 2007.

* cited by examiner

MILLING TOOL

CROSS-REFERENCE TO RELATED APPLICATION

This application is a continuation, under 35 U.S.C. §120, of copending international application PCT/AT2006/000426, filed Oct. 18, 2006, which designated the United States; this application also claims the priority, under 35 U.S.C. §119, of Austrian application GM 705/2005, filed Oct. 19, 2005; the prior applications are herewith incorporated by reference in their entirety.

BACKGROUND OF THE INVENTION

Field of the Invention

The invention relates to a milling tool with a tool shank with an axis of rotation D and a cutter region with at least one planar cutting edge which runs approximately perpendicularly with respect to the axis of rotation and which merges on the periphery into a main cutting edge and at the center into a secondary cutting edge. The secondary cutting edge is offset rearward with respect to the planar cutting edge in the direction of the axis of rotation.

Milling tools of this type are often used for plunging, that is to say the tool plunges circularly or obliquely, to the desired depth, into the surface of the work piece to be machined and then, by means of lateral advancing movements, removes the further material to be cut off. In the plunging process, the main cutting edges and the planar cutting edges, together with the corner region lying between them, precut in the main cutting direction and at the same time perform the main cutting work, while the trailing region of the cutter geometry, with the planar cutting edge and the secondary cutting edge, comes into engagement on the opposite side to the main cutting direction.

Such milling tools, in which the cutter region is formed by exchangeable indexable cutting plates, are described, for example, in U.S. Pat. No. 5,078,550 (cf. European published patent application EP 0 416 901 A) or in U.S. Pat. No. 5,145,295 (cf. European patent application EP 0 457 488 A).

Particularly in the case of an obliquely running secondary cutting edge and/or in the case of an oblique plunging of milling tools of this type, cutting forces occur which act radially on the tool and generate a lateral antipenetration force from the tool that leads to vibrations.

BRIEF SUMMARY OF THE INVENTION

It is accordingly an object of the invention to provide a milling tool, which overcomes the above-mentioned disadvantages of the heretofore-known devices and methods of this general type and which provides a milling tool, in which, during plunging, an undesirable radial antipenetration force associated with vibrations can be prevented.

With the foregoing and other objects in view there is provided, in accordance with the invention, a milling tool, comprising:

of a tool shank defining an axis of rotation D;

a cutter region having at least one planar cutting edge running approximately perpendicularly with respect to the axis of rotation D;

the planar cutting edge merging peripherally into a main cutting edge and merging centrally into a secondary cutting edge;

the secondary cutting edge being offset rearwardly with respect to the planar cutting edge in a direction of the axis of rotation D;

a transitional zone between the planar cutting edge and the secondary cutting edge having at least one notch formed therein, produced as a cutting edge portion and having a rearmost point, as seen in an end view in the direction of the axis of rotation D, lying behind a forward-most point of the secondary cutting edge;

the planar cutting edge and an adjoining portion of the notch enclosing an angle $\alpha$ in a range of 90°-175°;

the planar cutting edge and a portion of the notch adjoining the secondary cutting edge enclosing an angle $\beta$ in a range of 3°-90°;

the secondary cutting edge and a portion of the notch adjoining the secondary cutting edge enclosing an angle $\gamma$ in a range of 90°-177°.

In accordance with a preferred embodiment of the invention, the angle $\alpha$ lies in a range of 120°-150° and the angle $\beta$ lies in a range of 8°-35°.

In other words, the objects of the invention are achieved in that, in the transitional zone between the planar cutting edge and secondary cutting edge, at least one notch is formed which is produced as a cutting edge portion and of which the rearmost point, as seen in an end view in the direction of the axis of rotation D, lies behind the forward-most point of the secondary cutting edge, the angle $\alpha$ between the planar cutting edge and the contiguous portion of the notch lying in the range of 90°-175°, and the angle $\beta$ between the planar cutting edge and that portion of the notch which is contiguous to the secondary cutting edge lying in the range of 3°-90°, the angle $\gamma$ between that portion of the notch which is contiguous to the secondary cutting edge and the secondary cutting edge lying in the range of 90°-177°.

Owing to the special notch between the planar cutting edge and secondary cutting edge, an embedding of the cutter geometry in the work piece is achieved, which brings about a stabilization of the tool in the radial direction. The tool thereby has smooth motion without vibrations, so that greater advances during cutting and greater slopes during the plunging of the tool in the work piece become possible. Furthermore, the tools according to the invention may be produced with a longer projection, for example for the milling of turbine blades or integral components.

It is important that the angles described lie within the specified ranges.

If the angle $\alpha$ between the planar cutting edge and the contiguous portion of the notch is smaller than 90°, adverse cutting force distributions and adverse chip formation occur. If this angle lies above 175°, a sufficiently good stabilizing effect is not achieved by the notch.

If the angle $\beta$ between the planar cutting edge and that portion of the notch which is contiguous to the secondary cutting edge is smaller than 3°, likewise a sufficiently good stabilization of the tool is not achieved. If this angle is larger than 90°, there is the risk, particularly in the case of a secondary cutting edge running obliquely with respect to the planar cutting edge, of a fracture of the transitional zone between the secondary cutting edge and the contiguous portion of the notch.

If the angle $\gamma$ between that portion of the notch which is contiguous to the secondary cutting edge and the secondary cutting edge is larger than 177°, the stabilization of the tool during cutting is insufficient, while, in the case of an angle $\gamma$ of less than 90°, there is again the risk of fracture of the transitional zone between the secondary cutting edge and the contiguous portion of the notch.

The exact determination of these angles on the milling tool is carried out most expediently in a view normal to an imaginary plane which runs through the cutting corner between the main cutting edge and planar cutting edge and the axis of rotation of the milling tool. All the points of the cutting edges are projected onto this plane, and the contour profile of the cutting edges which thereby arises forms the basis for determining the angles.

The milling tools according to the invention have a longer service life, along with higher operating reliability.

The shape of the notch itself may be different. Overall, V-shaped, arcuate or trapezoidal notches may be envisaged. It is important, in this case, that the angles of the portions of the notch which are contiguous to the planar cutting edge and to the secondary cutting edge lie in the specified range. In the case of arcuate notches, the tangents to the transitional regions between the secondary cutting edge and planar cutting edge determine the fixing of the angles within the ranges according to the invention.

In a preferred range, in this case, the angle $\alpha$ between the planar cutting edge and the contiguous portion of the notch lies in the range of 120°-150°, and the angle $\beta$ between the planar cutting edge and that portion of the notch which is contiguous to the secondary cutting edge lies in the range of 10°-45°.

The depth of the notch is dependent on the size of the cutter region and, on the one hand, is to be as low as possible and, on the other hand, is nevertheless to be such that a sufficiently good stabilization of the tool during cutting is achieved.

It has proven to be particularly advantageous if the greatest depth t of the notch with respect to the forward-most point of the secondary cutting edge lies in the range of 0.1-1 mm.

The cutter geometry in the milling tools according to the invention may particularly advantageously be implemented by means of one or more exchangeable cutting inserts, in particular such cutting inserts having a substantially rectangular basic shape, with a secondary cutting edge running essentially parallel to the planar cutting edge, or an essentially rhomboidal basic shape, in which the secondary cutting edge runs at an inclination with respect to the planar cutting edge.

In the case of the rhomboidal basic shape, it has proven particularly advantageous to orient the secondary cutting edge with respect to the planar cutting edge at an angle $\delta$ in the range of 20°-40° and to produce the notch as a V-shaped notch with an angle $\alpha$ in the range of 140°-150° and with an angle $\beta$ in the range of 10°-30°.

With the above and other objects in view, there is also provided, in accordance with the invention, a cutting insert for a milling tool as described above. The cutting insert is formed with a bearing surface, a face opposite the bearing surface, and of a flank connecting the bearing surface and the face; and the individual cutting edges or cutting edge portions are formed at least at an intersection between the flank and the face.

Other features which are considered as characteristic for the invention are set forth in the appended claims.

Although the invention is illustrated and described herein as embodied in milling tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
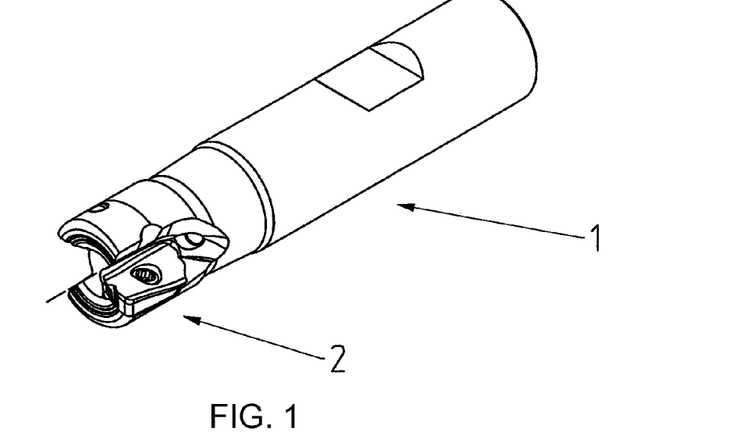
FIG. 1 is a perspective view of a milling tool according to the invention with an exchangeable cutting insert.
Figure 2:
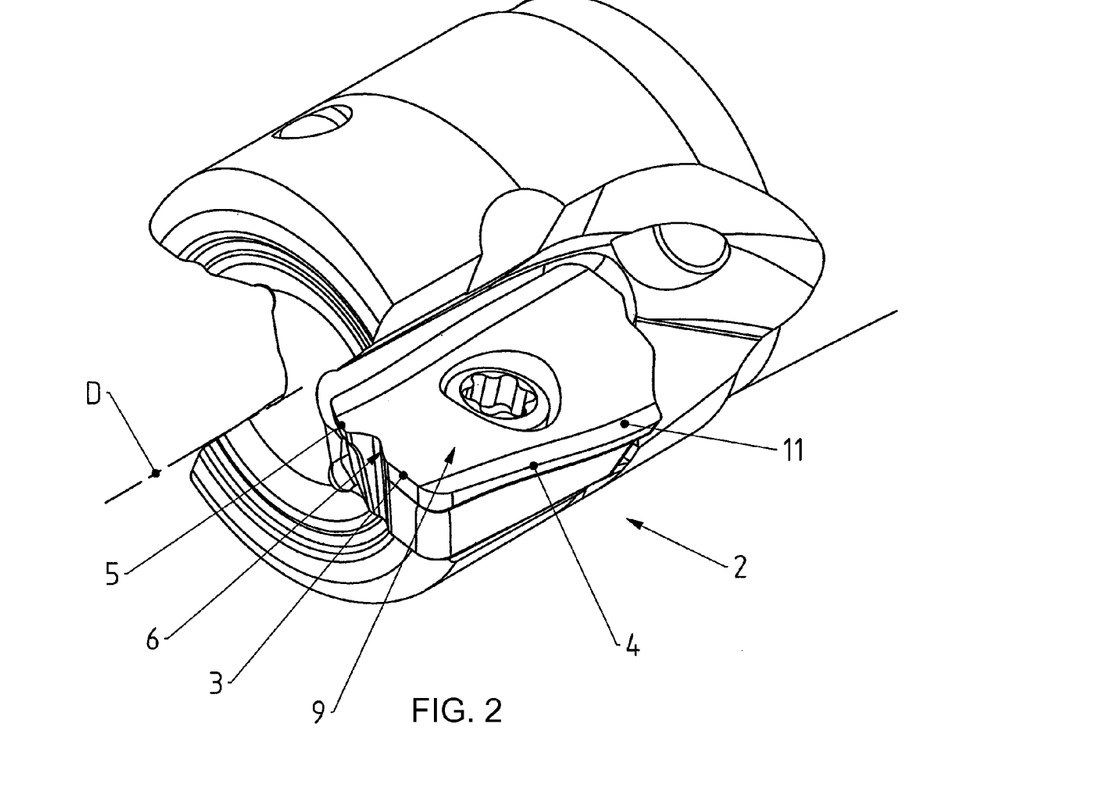
FIG. 2 is an enlarged partial view showing the cutter region of the milling tool according to FIG. 1.
Figure 5:
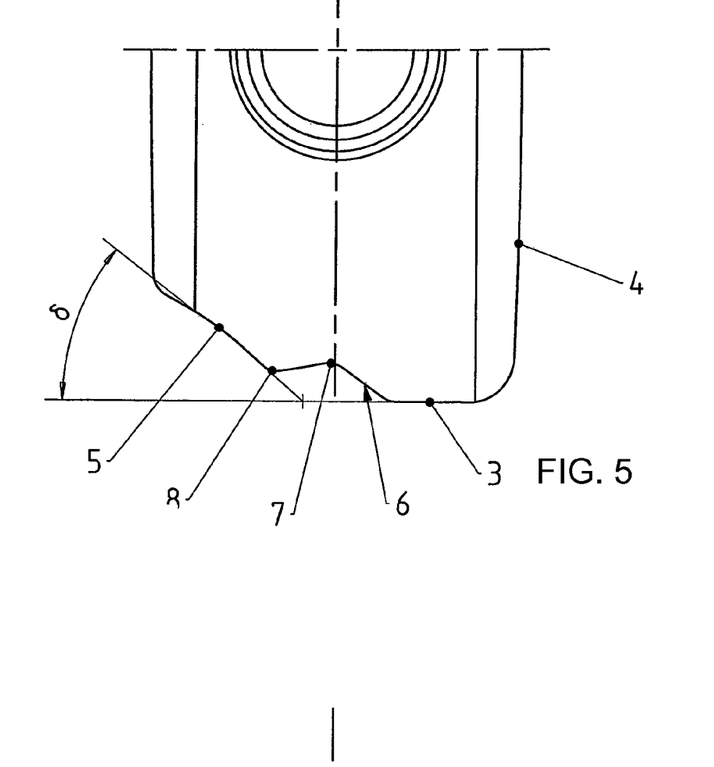
FIG. 5 is a top view of a detail of the cutting insert according to FIG. 4.

Referring now to the figures of the drawing in detail and first, particularly, to FIGS. 1 and 2 thereof, there is shown a cutter region 2 according to the invention of a milling tool for an exchangeable cutting insert 9. The angles $\alpha$, $\beta$, $\gamma$ and $\delta$ according to the invention, for the sake of clarity, are not illustrated on the milling tool equipped with the cutting insert, but, instead, on the cutting insert 9 itself, in a view normal to the bearing surface 10, insignificant changes of angle thereby occurring with respect to the angles measured in the tool, on account of the setting angle at which the bearing surface in the tool is inclined axially. The cutter region 2 has a planar cutting edge 3 which runs approximately perpendicularly with respect to the axis of rotation D of the milling tool. Approximately perpendicularly with respect to the axis of rotation means that, to produce as planar a milled surface as possible, although the aim is to have a planar cutting edge 3 which runs exactly perpendicularly with respect to the axis of rotation, an angle smaller by at most 10 has to be maintained, in practice, for easy cutting. The planar cutting edge 3 merges on the circumference, via a cutting corner designed in the form of an arc of a circle, into a main cutting edge 4 which runs approximately in the direction of the axis of rotation D. In the forming of indexable cutting plates, in which the main cutting edge 4 merges with a large transitional radius into the planar cutting edge 3, the planar cutting edge 3 may be restricted to a short end portion of this transitional radius. At the center, in the direction of the axis of rotation D, the planar cutting edge 3 merges into a secondary cutting edge 5 which runs at an angle $\delta$ of 35° with respect to the planar cutting edge 3. This angle can be seen in detail from FIG. 5.

In the transitional zone between the planar cutting edge 3 and secondary cutting edge 5 is formed a V-shaped notch 6 which is produced as a cutting edge portion and of which the rearmost point 7, as seen in the axis of rotation D, lies behind the forward-most point 8 of the secondary cutting edge 5.

Figure 3:
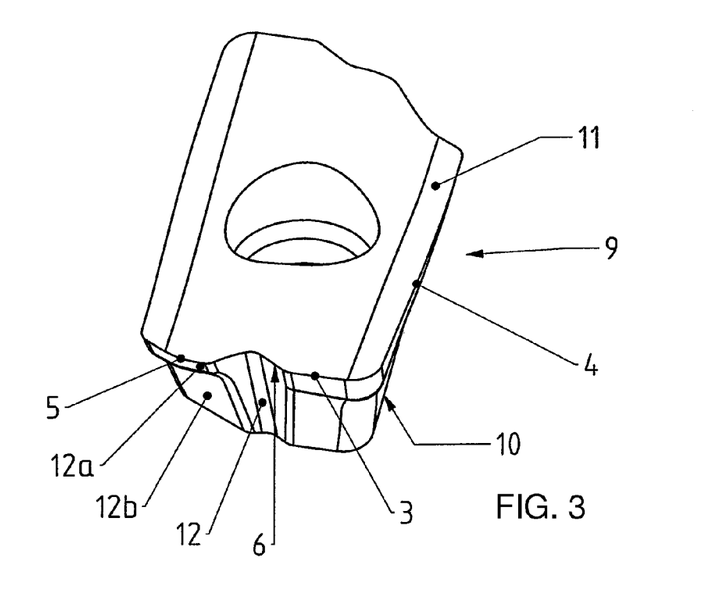
FIG. 3 is a perspective view of the cutting insert for the milling tool according to FIG. 1 and FIG. 2.
Figure 4:
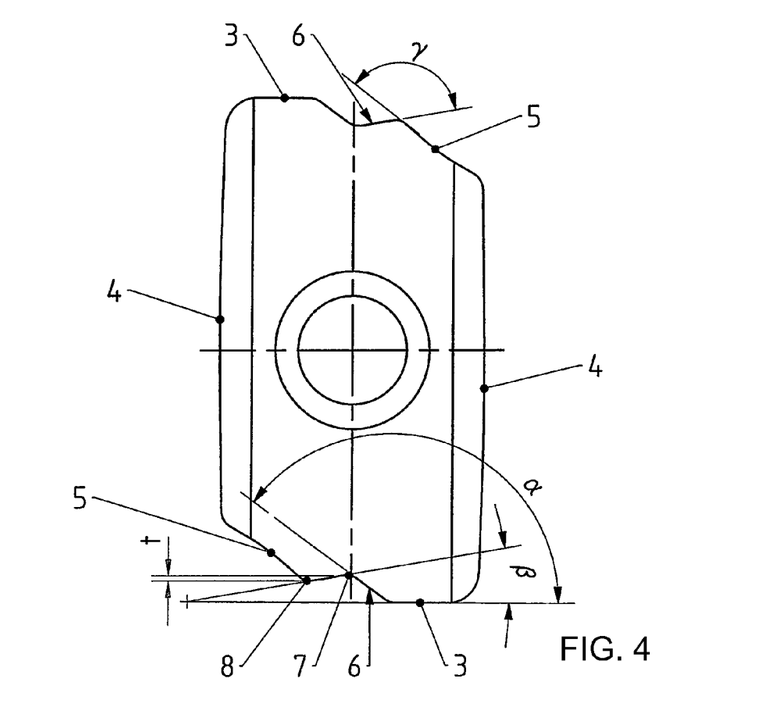
FIG. 4 is a top view of the cutting insert according to FIG. 3.

The exact design of this notch 6 with the associated angles may be gathered from FIGS. 3 and 4, in which the cutting insert 9 of the milling tool according to the invention, as shown in FIG. 1 and FIG. 2, is illustrated. That portion of the notch 6 which is contiguous to the planar cutting edge 3 encloses with the planar cutting edge 3 an angle $\alpha$ of 145°.

That portion of the notch 6 which is contiguous to the secondary cutting edge 5 forms with the planar cutting edge 3 an angle β of 11°.

In principle, the cutting insert 9 is designed as a positive indexable cutting plate with two identical cutting edge configurations lying opposite one another, that is to say all the cutting edges or cutting edge portions 3, 4, 5 and 6 are formed solely at the intersection of the flank 12, 12a with the face 11 on two sides lying mirror-symmetrically opposite one another, so that the indexable cutting plate can be used twice by being rotated.

A version as a negative indexable cutting plate would likewise be conceivable, where, in addition, cutting edges or cutting edge portions are also formed at the intersection of the bearing surface 10 with the flank, so that the indexable cutting plate may, overall, be used four times by being overturned and rotated.

It may be gathered from FIG. 3 that the bearing surface 10 and the opposite face 11 of the cutting insert 9 are connected to one another by means of the flank 12, 12a, 12b, the individual cutting edges or cutting edge portions 3, 4, 5 and 6 being formed at the intersection between the flank 12 and 12a and the face.

The rear point 7 of the notch 6 lies behind the forward-most point 8 of the secondary cutting edge 5, as seen in the longitudinal axis of the cutting insert 9.

In the region of the cutting edge portion designed as a notch 6, the flank 12 is formed in one piece with a uniform clearance angle, while, in the region of the planar cutting edges 3, the secondary cutting edges 5 and the main cutting edges 4, the flank 12 is divided in two, with an upper narrow portion 12a and with a set-back lower wider portion 12b.

The flank angle of the flank portion 12a is smaller than the flank angle of the flank portion 12b, so that, in the region of the cutting edges subjected to the highest stress, a good stability of the cutting edges, along with a sufficient clearance of the cutting insert during cutting, is achieved.

Figure 6:
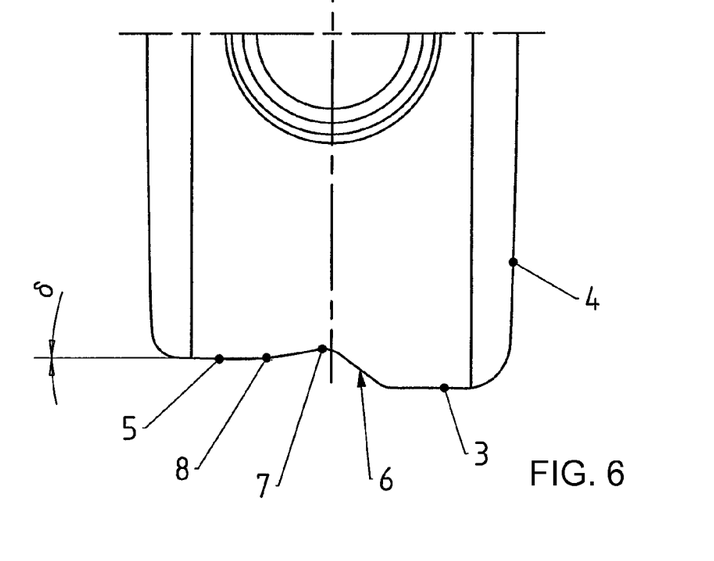
FIG. 6 is a top view of a detail of a variant of a cutting insert according to the invention.

FIG. 6 illustrates the variant of a cutting insert 9 for a milling tool according to the invention, in which variant the secondary cutting edge 5 runs parallel to the planar cutting edge 3, the angle δ, which these two cutting edges form with one another, therefore amounting to 0°.

FIGS. 7A to 7D show further possible variants as to how the notch 6 may be designed. It will be understood that the invention is in no way restricted to these variants.

It is in this case primarily important only that the portions of the respective notch 6 which are contiguous to the planar cutting edge 3 or to the secondary cutting edge 5 or their tangents to the transitional points have the angular ranges within the claimed ranges.

Figure 7A:
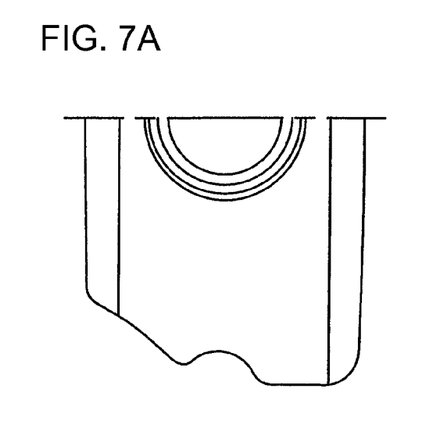
FIG. 7A-7D show further variants of cutting inserts according to the invention with different shapes of notches.
Figure 7B:
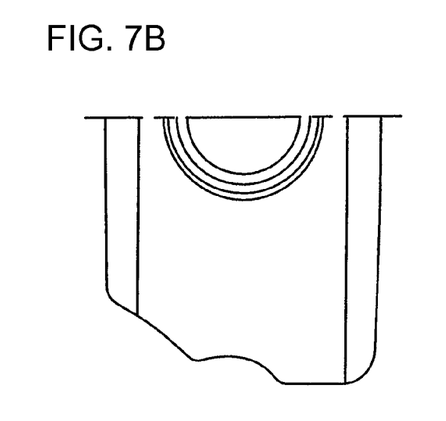
Figure 7C:
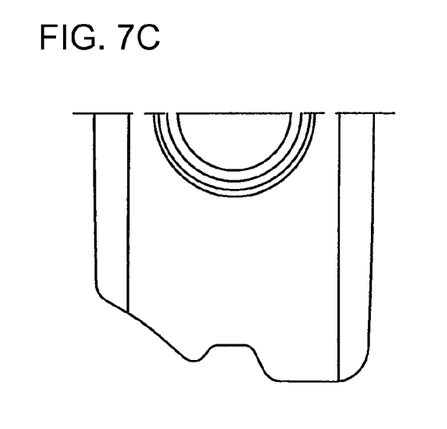
Figure 7D:
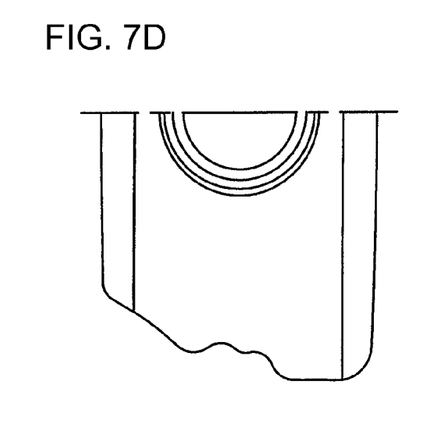

In FIG. 7a, the notch 6 is designed in the form of an arc of a circle, in FIG. 7b elliptical, in FIG. 7c trapezoidal and in FIG. 7d as a composite curved shape.

Figure 8:
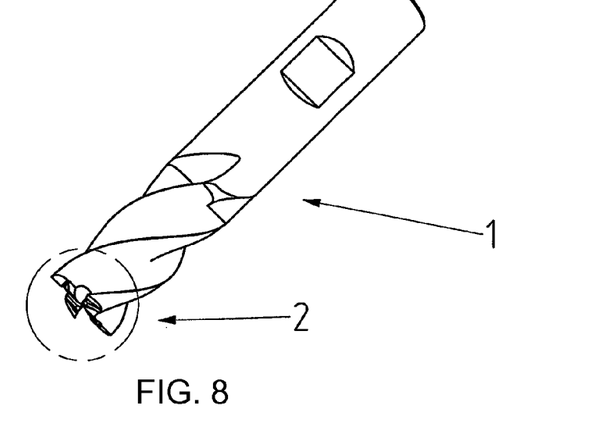
FIG. 8 is a perspective view of a milling tool according to the invention in a compact version with an integrated cutter region.
Figure 9:
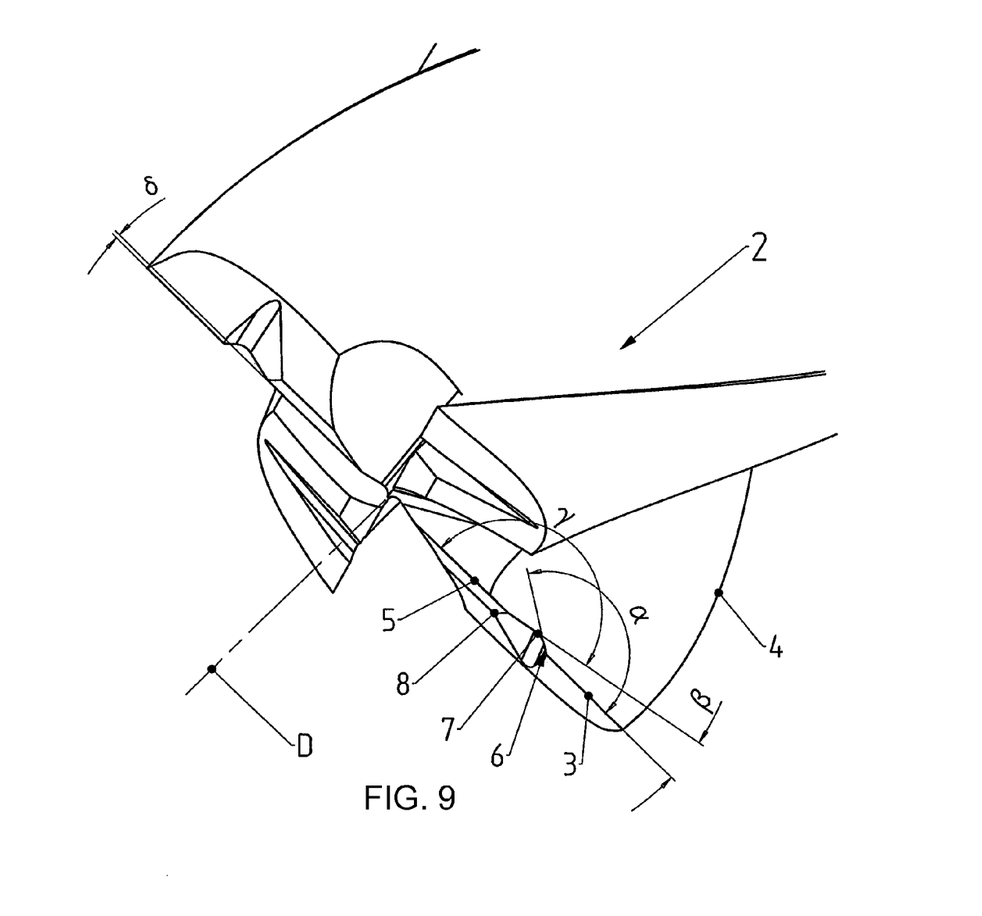
FIG. 9 is an enlarged partial view of the cutter region of the milling tool according to FIG. 8.

FIGS. 8 and 9 illustrate the cutter region 2 according to the invention on a compact milling tool consisting, for example, of steel or hard metal, a V-shaped notch 6 again being produced between the planar cutting edge 3 and secondary cutting edge 5. That portion of the notch 6 which is contiguous to the planar cutting edge 3 forms with the planar cutting edge 3 an angle α of 145°, and that portion of the notch 6 which is contiguous to the secondary cutting edge 5 forms with the planar cutting edge 3 an angle β of 11°.

The angle γ between that portion of the notch 6 which is contiguous to the secondary cutting edge 5 and the secondary cutting edge 5 amounts to 134°.

The secondary cutting edge 5 set back somewhat with respect to the planar cutting edge 3 runs parallel to the planar cutting edge, so that the angle δ amounts to 0°.

The invention claimed is:

1. A milling tool, comprising:
    a tool shank defining an axis of rotation D;
    a cutter region formed as a cutting head consisting of wear-resistant material and having at least one planar cutting edge running approximately perpendicularly with respect to the axis of rotation D;
    said planar cutting edge merging peripherally into a main cutting edge and merging centrally into a secondary cutting edge, and each of the planar, main, and secondary cutting edges being contemporaneously effective for cutting during an operation of the milling tool;
    said secondary cutting edge being offset rearwardly with respect to said planar cutting edge in a direction of the axis of rotation D;
    a transitional zone between said planar cutting edge and said secondary cutting edge having at least one notch formed therein, produced as a cutting edge portion and having a rearmost point, as seen in an end view in the direction of the axis of rotation D, lying behind a forward-most point of said secondary cutting edge;
    said planar cutting edge and an adjoining portion of said notch enclosing an angle α in a range of 90°-175°;
    said planar cutting edge and a portion of said notch adjoining said secondary cutting edge enclosing an angle β in a range of 3°-90°;
    said secondary cutting edge and a portion of said notch adjoining said secondary cutting edge enclosing an angle γ in a range of 90°-177°.

2. The milling tool according to claim 1, wherein the angle α lies in a range of 120°-150° and the angle β lies in a range of 8°-35°.

3. The milling tool according to claim 1, wherein a greatest depth t of said notch, with respect to the forward-most point of said secondary cutting edge lies in a range of 0.1-1 mm.

4. The milling tool according to claim 1, wherein said secondary cutting edge encloses an angle δ in a range of 20°-40° with said planar cutting edge, and said notch is a V-shaped notch with an angle α in a range of 140°-150° and an angle β in a range of 10°-30°.

5. A milling tool, comprising:
    a tool shank defining an axis of rotation D;
    an exchangeable cutting insert having a rectangular or rhomboidal basic shape and forming a cutter region having at least one planar cutting edge running approximately perpendicularly with respect to the axis of rotation D;
    said planar cutting edge merging peripherally into a main cutting edge and merging centrally into a secondary cutting edge;
    said secondary cutting edge being offset rearwardly with respect to said planar cutting edge in a direction of the axis of rotation D;
    a transitional zone between said planar cutting edge and said secondary cutting edge having at least one notch formed therein, produced as a cutting edge portion and having a rearmost point, as seen in an end view in the direction of the axis of rotation D, lying behind a forward-most point of said secondary cutting edge;
    said planar cutting edge and an adjoining portion of said notch enclosing an angle α in a range of 90°-175°;
    said planar cutting edge and a portion of said notch adjoining said secondary cutting edge enclosing an angle β in a range of 3°-90°;

said secondary cutting edge and a portion of said notch adjoining said secondary cutting edge enclosing an angle γ in a range of 90°-177°.

6. The milling tool according to claim 5, wherein the angle α lies in a range of 120°-150° and the angle β lies in a range of 8°-35°.

7. The milling tool according to claim 5, wherein a greatest depth t of said notch, with respect to the forward-most point of said secondary cutting edge lies in a range of 0.1-1 mm.

8. The milling tool according to claim 5, wherein said secondary cutting edge encloses an angle δ in a range of 20°-40° with said planar cutting edge, and said notch is a V-shaped notch with an angle α in a range of 140°-150° and an angle β in a range of 10°-30°.

9. A cutting insert for a milling tool, comprising:
a rectangular or rhomboidal basic shape with a bearing surface, a face opposite said bearing surface, and flanks connecting said bearing surface and said face;
an intersection between said flanks and said face forming cutting edges or cutting edge portions, with longer sides of said rectangular or rhomboidal basic shape defining main cutting edges and shorter sides thereof forming planar cutting edges extending substantially perpendicularly to said main cutting edges and merging into secondary cutting edges offset rearwardly with respect to a respective said planar cutting edge;
a transitional zone between said planar cutting edge and a respectively associated said secondary cutting edge having at least one notch formed therein, produced as a cutting edge portion and having a rearmost point, as seen in an end view in the direction of the axis of rotation D, lying behind a forward-most point of said secondary cutting edge;
said planar cutting edge and an adjoining portion of said notch enclosing an angle α in a range of 90°-175°;
said planar cutting edge and a portion of said notch adjoining said secondary cutting edge enclosing an angle β in a range of 3°-90°;
said secondary cutting edge and a portion of said notch adjoining said secondary cutting edge enclosing an angle γ in a range of 90°-177°.

10. The cutting insert according to claim 9, wherein the angle α lies in a range of 120°-150° and the angle β lies in a range of 8°-35°.

11. The cutting insert according to claim 9, wherein a greatest depth t of said notch, with respect to the forward-most point of said secondary cutting edge lies in a range of 0.1-1 mm.

12. The cutting insert according to claim 9, wherein said secondary cutting edge encloses an angle δ in a range of 20°-40° with said planar cutting edge, and said notch is a V-shaped notch with an angle α in a range of 140°-150° and an angle β in a range of 10°-30°.

* * * * *